US008633922B2

(12) United States Patent
Kim et al.

(10) Patent No.: US 8,633,922 B2
(45) Date of Patent: Jan. 21, 2014

(54) POWER SUPPLYING APPARATUS FOR ORGANIC LIGHT EMITTING DISPLAY

(75) Inventors: Min-Cheol Kim, Yongin (KR); Kyoung-Soo Lee, Yongin (KR)

(73) Assignee: Samsung Display Co., Ltd., Yongin, Gyeonggi-Do (KR)

(*) Notice: Subject to any disclaimer, the term of this patent is extended or adjusted under 35 U.S.C. 154(b) by 282 days.

(21) Appl. No.: 13/067,441

(22) Filed: Jun. 1, 2011

(65) Prior Publication Data

US 2011/0316841 A1 Dec. 29, 2011

(30) Foreign Application Priority Data

Jun. 25, 2010 (KR) ........................ 10-2010-0060652

(51) Int. Cl.
*G09G 5/00* (2006.01)
*G06F 3/038* (2013.01)

(52) U.S. Cl.
USPC .......................................................... 345/211

(58) Field of Classification Search
USPC .......................................................... 345/211
See application file for complete search history.

(56) References Cited

U.S. PATENT DOCUMENTS

2004/0201279 A1* 10/2004 Templeton ...................... 307/11
2010/0033467 A1* 2/2010 Park ............................. 345/211

FOREIGN PATENT DOCUMENTS

KR 10-2008-0070641 A 7/2008
KR 10-2009-0022676 A 3/2009
KR 10-2009-0077057 A 7/2009

* cited by examiner

*Primary Examiner* — Kevin M Nguyen
(74) *Attorney, Agent, or Firm* — Lee & Morse, P.C.

(57) ABSTRACT

There is provided a power supplying apparatus for an organic light emitting display in which a control circuit is provided between the input end of the power supplying apparatus and DC-DC converters for generating power sources in order to prevent a power sequence from being changed by the unintentional formation of a current path. The power supplying apparatus for an organic light emitting display includes a first switching element having a gate electrode coupled to a first node and coupled between an input end and an output end of the control circuit, a second switching element, to whose gate electrode a control signal is applied and which is coupled between the input end of the control circuit and the first node, and a third switching element, to whose gate electrode the control signal is applied and which is coupled between the first node and a ground.

20 Claims, 2 Drawing Sheets

POWER SUPPLYING APPARATUS FOR ORGANIC LIGHT EMITTING DISPLAY

BACKGROUND

1. Field

Embodiments relate to an organic light emitting display, and more particularly, to a power supplying apparatus for an organic light emitting display.

2. Description of the Related Art

Among flat panel displays (FPDs), organic light emitting displays are adapted to display an image using organic light emitting diodes (OLED) that generate light by re-combination of electrons and holes. Organic light emitting displays may be advantageous over other flat panel displays by having relatively high response speed and/or by being capable of being driven with relatively low power consumption.

In general, organic light emitting displays include a pixel unit having a plurality of pixels, a scan driver for supplying scan signals to the pixel unit, a data driver for supplying data signals to the pixel unit, and a power supplying unit for supplying pixel power sources ELVDD and ELVSS to the pixel unit.

More particularly, the power supplying unit provides a predetermined reference voltage to the scan driver and the data driver other than the pixel power source. The power supplying unit provides the high level voltage VGH and the low level voltage VGL of scan signals to the scan driver and provides a gamma reference voltage VCC for generating data signals to the data driver.

The pixels emit light components with brightness components corresponding to the data signals supplied in synchronization with the scan signals when the scan signals are supplied so that the pixel unit displays a predetermined image. In organic light emitting displays, emission brightness components of the pixels are affected by the voltages of the pixel power sources. That is, the pixel power sources determine the emission brightness components of the pixels with the data signals.

Therefore, the scan signals are first applied and then, the data signals are applied in synchronization with the scan signals in order to have the organic light emitting display normally driven.

However, in a conventional power supplying unit, a DC-DC converter is used in order to additionally generate the power sources. Due to the forward direction characteristic of a diode and an inductor included in the DC-DC converter, power sequence in an unintended order may be generated due to a current path formed within a short time before the DC-DC converter is normally driven.

SUMMARY

Embodiments are therefore directed to an organic light emitting display, and more particularly, to a power supplying apparatus for an organic light emitting display, which substantially overcome one or more of the problems due to the limitations and disadvantages of the related art.

It is therefore a feature of an embodiment to provide a provide a power supplying apparatus for an organic light emitting display in which a control circuit is provided between an input end of the power supplying apparatus and DC-DC converters for generating power sources.

It is therefore a separate feature of an embodiment to provide a power supplying apparatus for an organic light emitting display including a control circuit adapted to prevent a power sequence from being changed by an unintentional formation of a current path.

It is therefore a separate feature of an embodiment to provide a power supplying means adapted to prevent formation of an unintended current path due to a circuit structure of a DC-DC converter and to prevent erroneous operation of power sequence due to the unintended current path.

At least one of the above and other features and advantages may be separately realized by providing a power supplying apparatus for an organic light emitting display, including a control circuit adapted to receive an input voltage and to control a point of time at which the input voltage is output, and a plurality of DC-DC converters coupled to an output end of the control circuit, wherein the control circuit includes a first switching element including a gate electrode coupled to a first node and coupled between an input end and an output end of the control circuit, a second switching element including a gate electrode to which a control signal is applied, the second switching element being coupled between the input end of the control circuit and the first node, and a third switching element including a gate electrode to which a control signal is applied, the third switching element being coupled between the first node and ground.

The first and second switching elements may be PMOS transistors, and the third switching element may be an NMOS transistor.

The control circuit may further include a first capacitor coupled between the output end of the control circuit and ground, and a second capacitor coupled between the first node and ground.

Capacitance of the first capacitor may be larger than capacitance of the second capacitor.

The plurality of DC-DC converters may include a first DC-DC converter, a second DC-DC converter, and a third DC-DC converter.

The first DC-DC converter may be adapted to generate a first pixel power source at a high level and a second pixel power source at a low level that are applied to pixels of the organic light emitting display.

The second DC-DC converter may be adapted to generate a high level voltage and a low level voltage that are applied to a scan driver of the organic light emitting display.

The third DC-DC converter may be adapted to generate a high level gamma reference voltage applied to a data driver of the organic light emitting display.

At least one of the above and other features and advantages may be realized by providing a power supplying apparatus for an organic light emitting display, including a plurality of DC-DC converters, and a controller for selectively controlling a point of time at which an input voltage is output to plurality of DC-DC converters.

The controller may include an input terminal for receiving the input voltage and an output terminal, the controller selectively supplying or blocking supply of the input voltage to the output terminal.

At least one of the DC-DC converters may include a diode coupled to an inductor, and the controller includes a current path preventer for preventing unintentional current path formation as a result of the forward biasing of the diode and the inductor.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
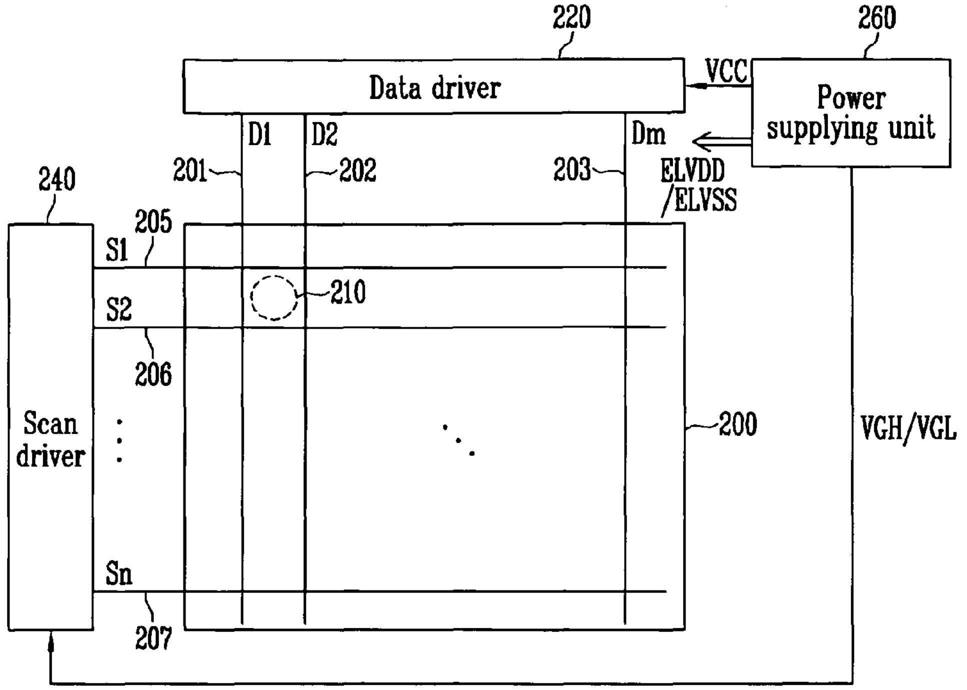
FIG. 1 illustrates a block diagram of an organic light emitting display according to an exemplary embodiment.

Korean Patent Application No. 10-2010-0060652, filed on Jun. 25, 2010, in the Korean Intellectual Property Office, and entitled: "Power Supplying Apparatus of Organic Light Emitting Display" is incorporated by reference herein in its entirety.

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when an element is referred to as being "on," "above", "below," or "under" another element, it can be directly "on," "above", "below," or "under" the other element, respectively, or intervening elements may also be present. In addition, it will also be understood that when an element is referred to as being "between" two elements, it can be the only element between the two elements, or one or more intervening elements may also be present.

It will be also be understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concept explained and illustrated herein include their complementary counterparts. Like reference numerals refer to like elements throughout the specification.

FIG. 1 illustrates a block diagram of an organic light emitting display according to an exemplary embodiment.

Referring to FIG. 1, the organic light emitting display may include a panel 200, a data driver 220, a scan driver 240, and a power supplying unit 260.

A plurality of data lines, 201, 202, . . . , 203, and scan lines 205, 206, . . . , 207 may be provided in the panel 200. Pixels 210 are formed respective regions where respective ones of the data lines 201, 202, . . . , 203 and the scan lines 205, 206, . . . , 207 intersect.

Each of the pixels 210 included in the panel 200 may include an organic light emitting diode (OLED) (not shown). In addition, each of the pixels 210 may include a pixel circuit (not shown) including at least two transistors and a storage capacitor. The pixel circuit may receive data signals D1, D2, . . . , Dm supplied through the data lines 201, 202, . . . , 203 in accordance with scan control signals S1, S2, . . . , and Sn supplied through the scan lines 205, 206, . . . , 207.

The data driver 220 may supply the data signals D1, D2, . . . , Dm through the plurality of data lines 201, 202, . . . , 203. The data driver 220 may perform digital/analog conversion. That is, input digital image signals may be converted into the data signals D1, D2, . . . , and Dm that are analog signals and then supplied to the data lines 201, 202, . . . , 203. In addition, while performing such digital/analog conversion, a gamma correcting operation may be performed.

Since the gamma correcting circuit may include a resistance ladder, resistance values included in the resistance ladder may be controlled so that the linearity of an image may be secured. When the voltage applied to the resistance ladder is referred to as a reference voltage, a driving circuit for forming the reference voltage is used and a gamma reference voltage VCC for activating the driving circuit is used. In embodiments, the gamma reference voltage VCC may be supplied from the power supplying unit 260.

The scan driver 240 may supply the scan signals S1, S2, . . . , and Sn through the plurality of scan lines 205, 206, . . . , 207. The pixels 210 coupled to respective scan lines 205, 206, . . . , 207 may be selected by the scan signals S1, S2, . . . , Sn transmitted through the respective scan lines 205, 206, . . . , 207.

The power supplying unit 260 may provide a high level voltage VGH and a low level voltage VGL of the scan signals to the scan driver 240.

The data signals D1, D2, . . . , and Dm may be supplied from the data driver 220 to selected ones of the pixels 210 so that the OLEDs included in the selected pixels 210 may emit light. Emission brightness of the OLEDs correspond to the levels of the applied data signals D1, D2, . . . , and Dm. The emission brightness of the pixels 210 may be determined in accordance with a level difference between a first power source voltage ELVDD, e.g., a high power source voltage, and the data signals D1, D2, . . . , and Dm.

The power supplying unit 260 may receive an externally supplied input voltage supplied and may generate a power source voltage required for operating of components of the organic light emitting display.

The power supplying unit 260 may provide the first pixel power source ELVDD and a second pixel power source ELVSS to the pixels included in the panel 200, may provide the gamma reference voltage VCC to the data driver 220 as described above, and may provide the high level voltage VGH and the low level voltage VGL of the scan signals to the scan driver 240.

Figure 2:
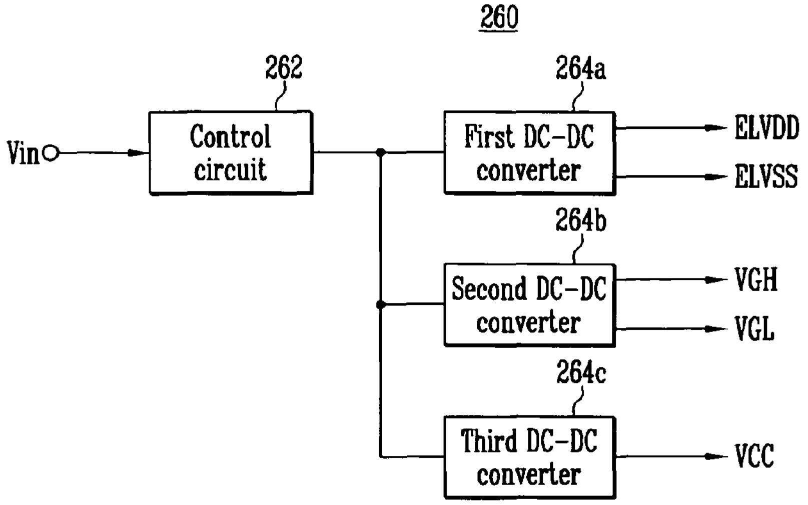
FIG. 2 illustrates a block diagram of an exemplary embodiment of the power supplying unit of FIG. 1.

FIG. 2 illustrates a block diagram of an exemplary embodiment of the power supplying unit 260 of FIG. 1. The power supplying unit 260 may include a plurality of DC-DC converters 264 that may provide different power source voltages to the pixels 210.

More particularly, e.g., the power supplying unit 260 may include a first DC-DC converter 264*a*, a second DC-DC converter 264*b*, and a third DC-DC converter 264*c*. The first DC-DC converter 264*a* may generate the first pixel power source ELVDD having a high level and the second pixel power source ELVSS having a relatively low level to the pixels 210. The second DC-DC converter 264*b* may generate the high level voltage VGH and the low level voltage VGL that are applied to the scan driver 240. The third DC-DC converter 264*c* may generate the high level gamma reference voltage VCC applied to the data driver 220.

Due to the forward characteristic of a diode D1 and an inductor L (see, e.g., FIG. 3) that may be included in the DC-DC converters 264, as described above, in cases in which a control circuit, e.g., control circuit 262, is not provided, power sequence in an unexpected order may be generated by a current path formed within a short time before the DC-DC converters 264 are normally driven.

More particularly, e.g., in cases not including the control circuit 262, before the second DC-DC converter 264*b* generates the high level voltage VGH and the low level voltage VGH of the scan signals S1, S2, Sn, it may be driven to be normalized and due to the current path formed by the forward characteristic of the diode and the inductor coupled between an input end and an output end in the DC-DC converter, the DC-DC converter 264*c* that generates the gamma reference voltage VCC may be first driven such that the power sequence may unintentionally operate.

In embodiments, in order to prevent the power sequence from being changed due to the unintended formation of a current path, the control circuit 262 may be provided between an input end of the power supplying unit 260 and the DC-DC converters 264 that generate the respective power supply voltages.

Hereinafter, the detailed structure and operation of the power supplying unit 260 according to embodiments will be described in detail with reference to FIGS. 2 to 4.

FIG. 2 illustrates a block diagram of an exemplary embodiment of the power supplying unit 260 of FIG. 1. Referring to FIG. 2, the power supplying unit 260 may include the control circuit 262. An input voltage Vin may be applied to the control circuit 262. The control circuit 262 may control supply of the input voltage to the respective DC-DC converters 264. More particularly, e.g., the control circuit 262 may control a timing at which the input voltage Vin is respectively output to first, second, and third DC-DC converters 264*a*, 264*b*, and 264*c* coupled to the output end of the control circuit 262.

The input voltage Vin may be an external power source input from a battery (not shown). In embodiments, the input voltage Vin may be converted into a voltage having a level suitable for the components of the organic light emitting display through the DC-DC converters, e.g., 264*a*, 264*b*, 264*c*, before being supplied, e.g., to the pixels 210.

More particularly, e.g., the first DC-DC converter 264*a* may generate the first pixel power source ELVDD having a high level and the second pixel power source ELVSS having a relatively low level that may be applied to the pixels 210. The second DC-DC converter 264*b* may generate the high level voltage VGH and the low level voltage VGL that may be applied to the scan driver 240. The third DC-DC converter 264*c* may generate the gamma reference voltage VCC having a high level that may be applied to the data driver 220. Embodiments are not limited to three DC-DC converters 264*a*, 264*b*, 265*c*.

For example, the power supplying unit 260 may further include another DC-DC converter for generating a reference power source for providing an initializing signal Vint and an emission control signal.

Figure 3:
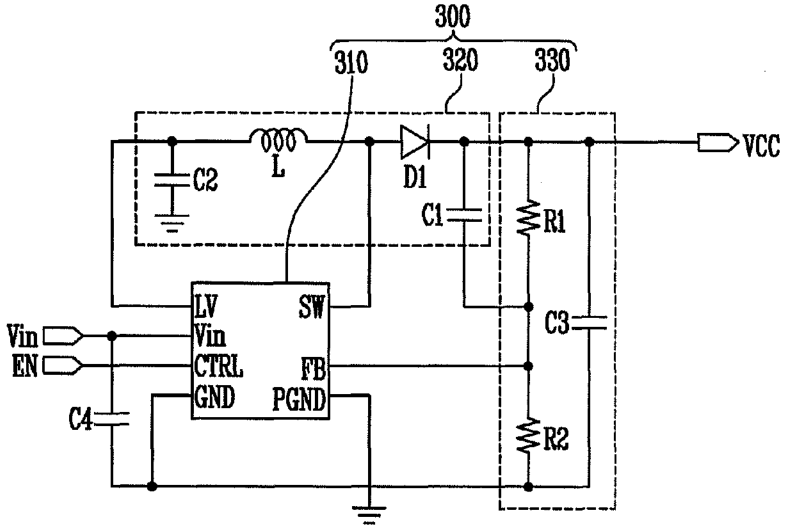
FIG. 3 illustrates a circuit diagram of an exemplary embodiment of a DC-DC converter of FIG. 2.

FIG. 3 illustrates a circuit diagram of an exemplary DC-DC converter 300 corresponding to an exemplary embodiment of the third DC-DC converter 264*c* of FIG. 2. The third DC-DC converter 300 for generating one voltage level will be described below as an example, and embodiments are not limited thereto.

Referring to FIG. 3, the DC-DC converter 300 may include a switching controller 310, a boosting unit 320, and a feedback unit 330. The DC-DC converter 300 may be considered as a boost type converter for boosting an input voltage Vin by repeating charge and discharge of an inductor L.

The switching controller 310 may include, e.g., one chip having a plurality of terminals including a power source applying terminal LV, a power source input terminal Vin, a control terminal CTRL, ground terminals GND and PGND, a feedback terminal FB, and a switching terminal SW.

The switching controller 310 may control operation of the DC-DC converter 300 in response to an externally supplied enable signal EN to the control terminal CTRL. For example, when the enable signal EN is an off state, e.g., at a low level, the DC-DC converter 300 may not be driven. When the enable signal EN is in an on state, e.g., at a high level, the DC-DC converter 300 may be driven to output a predetermined voltage, for example, the gamma reference voltage VCC.

The switching controller 310 may apply the voltage Vin to the boosting unit 320 via the power source input terminal LV. The switching controller 310 may switch the charge and discharge operations of the boosting unit 320 in response to the enable signal EN.

In some embodiments, the switching controller 310 may further include a fourth capacitor C4 for stabilizing the input voltage Vin.

The boosting unit 320 may include an inductor L, a diode D1, and a first capacitor C1. The boosting unit 320 may boost the input voltage Vin received in accordance with the switching of the switching controller 310 to a uniform level and may output the gamma reference voltage VCC.

In detail, a first end of the inductor L may be coupled to the power source applying terminal LV of the switching controller 310, and may receive the input voltage Vin. An anode of the diode D1 may be coupled to a second end of the inductor L and a cathode of the diode D1 may be coupled to an output end of the DC-DC converter 300. A first terminal of the first capacitor C1 may be coupled to the cathode of the diode D1. In addition, a node formed by coupling the second end of the inductor L and the anode of the diode D1 to each other may be coupled to the switching terminal SW of the switching controller 310.

Operation of the boosting unit 320 may repeatedly charge the input voltage Vin in the inductor L and discharge the input voltage Vin from the inductor L in accordance with the switching of the switching controller 310. That is, the switching controller 310 may couple the first end of the inductor L to ground GND to charge the power source voltage Vin in the inductor L during a switching on period and may float the second end of the inductor L to output the input voltage Vin charged in the inductor L to the diode D1 during a switching off period.

The input voltage is boosted by repeatedly performing charge and discharge to be output. The boosting ratio of the input voltage is controlled by the duty ratio of the on/off periods. On the other hand, the boosting unit 320 may further include a stabilizing second capacitor C2 coupled to one end of the inductor L.

In addition, in the case of the DC-DC converter illustrated in FIG. 3, the boosting unit 320, e.g., a boosting circuit, may be provided to boost the input voltage Vin and to output the boosted input voltage. When a buck boosting circuit or an inverting circuit is added to the DC-DC converters 264, the first and second DC-DC converters, e.g., 264*a*, 264*b* may output the voltage values having opposite levels.

As discussed above, however, e.g., in cases not including the control circuit 262, before the second DC-DC converter 264*b* generates the high level voltage VGH and the low level voltage VGH of the scan signals S1, S2, . . . , Sn, it may be driven to be normalized and due to the current path formed by the forward characteristic of the diode and the inductor coupled between an input end and an output end in the DC-DC converter, the DC-DC converter 264*c* that generates the gamma reference voltage VCC may be first driven such that the power sequence may unintentionally operate.

In embodiments, in order to prevent the power sequence from being changed due to the unintended formation of a current path, the control circuit 262 may be provided between an input end of the power supplying unit 260 and the DC-DC converters 264 that generate the respective power supply voltages.

Embodiments may be advantageous relative to comparable conventional devices by providing, e.g., the control circuit between the input end of the power supplying unit 260 and the plurality of DC-DC converters, e.g., 264*a*, 264*b*, 264*c*, and the control circuit 252 may controllably output the input voltage Vin to the DC-DC converters, e.g., 264*a*, 264*b*, 264*c*, at controlled points of time.

Figure 4:
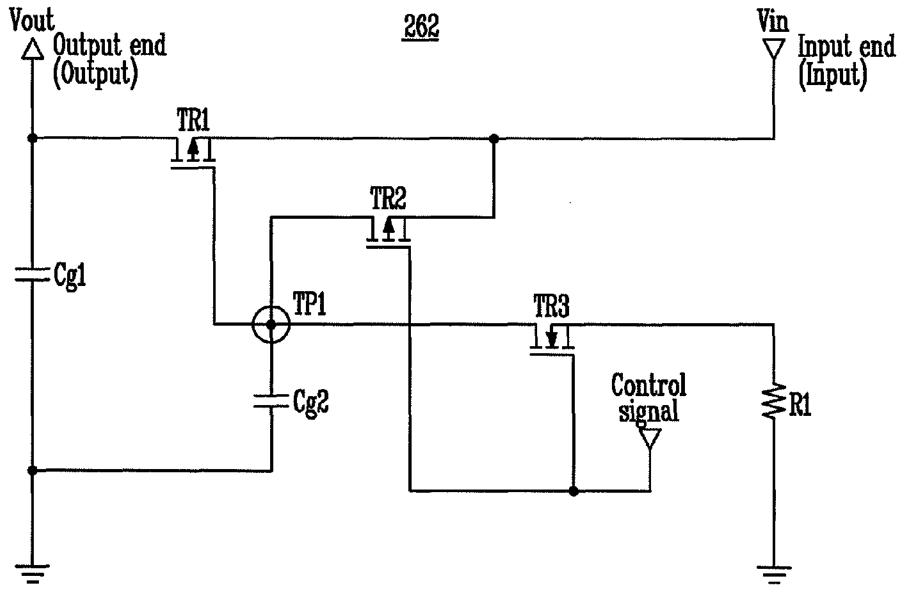
FIG. 4 illustrates a circuit diagram of an exemplary embodiment of the control circuit of FIG. 2.

FIG. 4 illustrates a circuit diagram of an exemplary embodiment of the control circuit 262 of FIG. 2.

Referring to FIG. 4, the input voltage Vin may be applied to an input end Input of the control circuit 262 and an output end Output of the control circuit 262 may be coupled to the DC-DC converters 264. The control circuit 262 may control a point of time at which the input voltage Vin is output, during transmission of the input voltage Vin as the external power source, to the DC-DC converters.

The control circuit 262 may include a plurality of switching elements, e.g., three switching elements TR1, TR2, TR3, and TR3, and a plurality of capacitors, e.g., two capacitors Cg1 and Cg2. In the exemplary embodiment of FIG. 4, the first and second switching elements TR1 and TR2 are realized by PMOS transistors and the third switching element TR3 is realized by an NMOS transistor. However, embodiments are not limited thereto.

The first switching element TR1 may be coupled between the input end and the output end of the control circuit 262. That is, e.g., a first electrode of the first switching element TR1 may be coupled to the input end and a second electrode of the first switching element TR1 may be coupled to the output end. A gate electrode of the first switching element TR1 may be coupled to a first node TP1.

A control signal may be applied to a gate electrode of the second switching element TR2. The second switching element TR2 may be coupled between the input end of the control circuit 262 and the first node TP1. That is, a first electrode of the second switching element TR2 may be coupled to the input end and a second electrode of the second switching element TR2 may be coupled to the first node TP1.

The control signal may be applied to a gate electrode of the third switching element TR3. The third switching element TR3 may be coupled between the first node TP1 and a ground GND. That is, e.g., a first electrode of the third switching element TR3 may be coupled to the input end and a second electrode of the third switching element TR3 may be coupled to ground GND.

In embodiments, the control signal may be applied to the gate electrodes of the second and third switching elements TR2 and TR3 to control on/off timings, which may be controlled based on operation characteristic of the organic light emitting display.

The first capacitor Cg1 may be coupled between the output end of the control circuit and ground GND. The first capacitor Cg1 may have a relatively high level capacitance in order to increase a charge time so that it may be possible to prevent all of the input voltage Vin applied from the output end to the input end during an incomplete off state of the second switching element TR2 from being transmitted when the control circuit 262 is initially driven.

In embodiments, the second capacitor Cg2 coupled between the first node TP1 and the ground GND may have lower capacitance than the first capacitor Cg1. The second capacitor Cg2 may maintain the off state of the first switching element TR1.

Exemplary operation of the control circuit 262 having the above structure will be described below. That is, the control circuit is driven in a state where the input voltage Vin is blocked and in a state where the input voltage Vin is applied. An exemplary sequence is as follows.

First, in the state where the input voltage Vin is blocked, the control signal may be applied at a low level. In the exemplary embodiment of FIG. 4, at this time, the second switching element TR2 is turned on since the second switching element TR2 is PMOS type, and the third switching element TR3 is turned off since the third switching element TR3 is NMOS type.

Therefore, the input voltage Vin applied to the input end Input may be transmitted to the first node TP1 by the second switching element TR2 being turned on. The input voltage Vin may be stored in the second capacitor Cg2 coupled to the first node TP1.

At this time, with the gate electrode of the first switching element TR1 being coupled to the first node TP1, the first switching element TR1 is turned off. Therefore, at this stage, the input voltage Vin is not transmitted to the output end Output of the control circuit.

A state in which the input voltage Vin is applied may be realized when the control signal is applied at a high level. In the exemplary embodiment of FIG. 4, at this time, the second switching element TR2 is turned off since the second switching element TR2 is PMOS type, and the third switching element TR3 is turned on since the third switching element TR3 is NMOS type.

The input voltage Vin stored in the second capacitor cg2 by the third switching element TR3 being turned on may be discharged to the ground GND through the first and second electrodes of the third switching element TR3 and a resistor R1. Therefore, the voltage of the first node TP1 is reduced to a low level, that is, a ground voltage.

Therefore, with the gate electrode of the first switching element TR1 being coupled to the first node TP1, the first switching element TR1 is turned on. As a result, the input voltage Vin applied to the first electrode of the first switching element TR1 is output to the output end Output of the control circuit coupled to the first electrode of the first switching element TR1.

When the input voltage applied to the power supplying unit 260 through the control circuit 262 is transmitted to the DC-DC converters 264, the points in time at which the input voltage Vin is output may be controlled. Therefore, in embodiments, it may be possible to prevent an unintended order of the power sequence from occurring as a result of a current path formed within a short time before the DC-DC converters are normally driven due to the forward direction characteristic of the diode and the inductor included in the DC-DC converter.

More particularly, a DC-DC converter generally includes a diode and an inductor that are coupled between an input end and an output end of the DC-DC converter. During operation, before a DC-DC converter for generating a high level voltage and a low level voltage for scan signals is driven to be normalized, as a result of a current path formed by forward direction characteristics of the diode and the inductor, the DC-DC converter for generating a gamma reference voltage may be first driven so that the power sequence may unintentionally change.

Since the diode and the inductor included in the DC-DC converter are provided in positions necessary to drive the DC-DC converter, it is not possible to change or remove the diode and the inductor so that it is difficult to prevent such unintentionally change in power sequence. Embodiments described herein may be advantages by, e.g., providing a power supplying unit that is capable of controlling points in time at which an input voltage Vin is output to DC-DC converters.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A power supplying apparatus for an organic light emitting display, comprising:

a control circuit adapted to receive an input voltage and to control output of input voltage; and a plurality of DC-DC converters coupled to an output end of the control circuit, wherein the control circuit includes:

a first switching element including a gate electrode coupled to a first node and coupled between an input end and the output end of the control circuit;

a second switching element including a gate electrode to which a control signal is applied, the second switching element being coupled between the input end of the control circuit and the first node; and a third switching element including a gate electrode to which a control signal is applied, the third switching element being coupled between the first node and ground.

2. The power supplying apparatus for an organic light emitting display as claimed in claim 1, wherein the first and second switching elements are PMOS transistors, and wherein the third switching element is an NMOS transistor.

3. The power supplying apparatus for an organic light emitting display as claimed in claim 1, wherein the control circuit further comprises:

a first capacitor coupled between the output end of the control circuit and ground; and a second capacitor coupled between the first node and ground.

4. The power supplying apparatus for an organic light emitting display as claimed in claim 3, wherein capacitance of the first capacitor is larger than capacitance of the second capacitor.

5. The power supplying apparatus for an organic light emitting display as claimed in claim 1, wherein the plurality of DC-DC converters include a first DC-DC converter, a second DC-DC converter, and a third DC-DC converter.

6. The power supplying apparatus for an organic light emitting display as claimed in claim 5, wherein the first DC-DC converter is adapted to generate a first pixel power source at a high level and a second pixel power source at a low level that are applied to pixels of the organic light emitting display.

7. The power supplying apparatus for an organic light emitting display as claimed in claim 5, wherein the second DC-DC converter is adapted to generate a high level voltage and a low level voltage that are applied to a scan driver of the organic light emitting display.

8. The power supplying apparatus for an organic light emitting display as claimed in claim 5, wherein the third DC-DC converter is adapted to generate a high level gamma reference voltage applied to a data driver of the organic light emitting display.

9. A power supplying apparatus for an organic light emitting display, comprising:

a plurality of DC-DC converters; and a controller to control voltage to plurality of DC-DC converters, wherein:

the controller controls the voltage to change from a first time to a second time, the voltage at the second time substantially corresponding to an input voltage and the voltage at the second time being different from the input voltage, and the plurality of DC-DC converters are driven in a predetermined sequence based on the change of the voltage from the first time to the second time.

10. The power supplying apparatus as claimed in claim 9, wherein the controller includes an input terminal for receiving the input voltage and an output terminal, the controller controlling output of the voltage from the first time to the second time in a first state and blocking output of voltage to the output terminal in a second state.

11. The power supplying apparatus as claimed in claim 9, wherein at least one of the DC-DC converters includes a diode coupled to an inductor, and the controller includes a current path preventing circuit to prevent unintentional current path formation as a result of the forward biasing of the diode and the inductor.

12. The power supplying apparatus as claimed in claim 9, wherein the controller controls the voltage to increase from the first time to the second time.

13. The power supplying apparatus as claimed in claim 12, wherein the plurality of DC-DC converters includes a first DC-DC converter which is driven based on first voltage and a second DC-DC converter which is driven based on a second voltage greater than the first voltage.

14. The power supplying apparatus as claimed in claim 13, wherein:

the first voltage is less than the input voltage into the controller, and the second voltage substantially corresponds to the input voltage.

15. The power supplying apparatus as claimed in claim 13, wherein the second DC-DC converter includes:

a diode coupled to an output terminal, an input terminal coupled to the controller, an inductor coupled between the input terminal and diode, wherein a current path is established by the diode when the voltage at the second time is received by the input terminal of the second DC-DC converter.

16. The power supplying apparatus as claimed in claim 15, wherein the predetermined sequence includes the first DC-DC converter being driven before the second DC-DC converter.

17. The power supplying apparatus as claimed in claim 16, wherein:

the first DC-DC converter generates one or more voltages to a driver circuit of a display, and the second DC-DC converter generates a gamma voltage for the display.

18. The power supplying apparatus as claimed in claim 9, wherein the controller includes:

an output terminal coupled to the plurality of DC-DC converters, and a capacitor coupled to the output terminal, wherein the controller controls the voltage to change from the first time to the second time based on the capacitance of the capacitor coupled to an output terminal of the controller.

19. The power supplying apparatus as claimed in claim 18, wherein a rate of change of the voltage from the first time to the second time is based on the capacitance of the capacitor coupled to the output terminal of the controller.

20. The power supplying apparatus as claimed in claim 9, wherein the plurality of DC-DC converters are coupled to a same output terminal of the controller.

* * * * *